(12) United States Patent
Gutman et al.

(10) Patent No.: US 11,996,873 B2
(45) Date of Patent: *May 28, 2024

(54) BEAM DEPENDENT DIGITAL PRE-DISTORTION

(71) Applicant: QUALCOMM Incorporated, San Diego, CA (US)

(72) Inventors: Igor Gutman, Hod HaSharon (IL); Carl Hardin, Encinitas, CA (US); Yehezkel Hadid, Kfar Saba (IL); Robert Zokaim, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/188,047

(22) Filed: Mar. 22, 2023

(65) Prior Publication Data

US 2023/0223973 A1    Jul. 13, 2023

Related U.S. Application Data

(63) Continuation of application No. 17/316,238, filed on May 10, 2021, now Pat. No. 11,658,692.

(51) Int. Cl.
*H04B 1/04* (2006.01)
*H04B 7/06* (2006.01)

(52) U.S. Cl.
CPC ......... *H04B 1/0475* (2013.01); *H04B 7/0617* (2013.01); *H04B 7/0639* (2013.01); *H04B 2001/0425* (2013.01)

(58) Field of Classification Search
CPC ............... H04B 1/0475; H04B 7/0617; H04B 2001/0425
USPC .................. 375/267, 296, 297; 455/114.3
See application file for complete search history.

(56) References Cited

U.S. PATENT DOCUMENTS

| | | | | |
|---|---|---|---|---|
| 10,469,109 | B2* | 11/2019 | Gutman | H03F 3/24 |
| 10,841,018 | B2* | 11/2020 | Tervo | H04B 7/0617 |
| 11,296,735 | B1* | 4/2022 | Kutz | H04B 1/0475 |
| 11,658,692 | B2* | 5/2023 | Gutman | H04B 7/0639 |
| | | | | 455/114.3 |
| 2006/0210070 | A1 | 9/2006 | Reznik et al. | |
| 2011/0235748 | A1 | 9/2011 | Kenington | |
| 2012/0321018 | A1 | 12/2012 | Chen et al. | |
| 2017/0180061 | A1* | 6/2017 | Ishikawa | H04B 1/0475 |
| 2019/0068429 | A1 | 2/2019 | Sagi et al. | |
| 2019/0089389 | A1 | 3/2019 | Gutman et al. | |

(Continued)

*Primary Examiner* — Don N Vo
(74) *Attorney, Agent, or Firm* — Holland & Hart LLP

(57) ABSTRACT

Methods, systems, and devices for wireless communications are described. For example, a transmitting wireless device, such as a user equipment or a base station, may apply a first set of digital pre-distortion (DPD) coefficients to a plurality of antenna elements to form a first transmit beam. The wireless device may determine to switch from using the first transmit beam to using a second transmit beam that is different from the first transmit beam and may apply a second set of DPD coefficients to the plurality of antenna elements to form the second transmit beam, where the second set of DPD coefficients is different from the first set of DPD coefficients. The wireless device may transmit signaling using the second transmit beam based at least in part on applying the second set of DPD coefficients.

30 Claims, 13 Drawing Sheets

(56) References Cited

U.S. PATENT DOCUMENTS

2022/0166389 A1  5/2022  Hamid
2022/0360283 A1  11/2022  Gutman et al.

* cited by examiner

BEAM DEPENDENT DIGITAL PRE-DISTORTION

CROSS REFERENCE

The present Application for Patent is a continuation of U.S. patent application Ser. No. 17/316,238 by GUTMAN et al., entitled "BEAM DEPENDENT DIGITAL PRE-DISTORTION," filed May 10, 2021, assigned to the assignee hereof, and expressly incorporated by reference herein.

FIELD OF TECHNOLOGY

The following relates to wireless communications, including beam dependent digital pre-distortion (DPD).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A transmitting device, such as a base station or a UE, may be equipped with multiple antenna elements each with an associated power amplifier (PA) for transmitting beamformed communications. The antenna elements and PAs of the transmitting device may be grouped into one or more antenna modules which may also be referred to as radio frequency (RF) modules. The transmitting device may experience non-linearities associated with operations of the power amplifiers. These non-linearities may compound in transmitting devices that have multiple antenna elements and thus multiple power amplifiers. For example, the non-linearity caused by each PA may be different.

SUMMARY

The described techniques relate to improved methods, systems, devices, and apparatuses that support beam dependent digital pre-distortion (DPD). Generally, the described techniques provide for the application and calibration of beam dependent digital pre-distortion coefficients.

In some wireless communications systems, a DPD engine may power a radio frequency module including a number of antenna element/power amplifier pairs. In such examples, a single set of DPD coefficients may be effective if the elements experience the same or similar non-linear characteristics. In some examples, however, each antenna element may experience different non-linearity characteristics due to different physical layouts and beamforming, which may generate different loading per antenna element.

For example, each DPD engine may apply DPD coefficients to a number power amplifier (PA) elements each associated with an antenna element, where the antenna element/PA pairs are distributed across a number of antenna modules. The non-linearity characteristics of each of the power amplifier elements may be different and may be affected by a different antenna loading per beam configuration. This may cause DPD coefficient performance to be different per beam. In other words, a generalized DPD training procedure may determine coefficients that work more effectively for some antenna modules than others.

In some examples, it may be more efficient to perform a DPD training procedure on a per-transmit beam basis. For example, each time a transmit beam is changed, the DPD coefficients may be selected for the new transmit beam. In some examples, upon an initial boot-up procedure, a device may perform a DPD training procedure and may optionally also perform DPD training procedures over time while in operation. Based on the DPD training procedure (which is performed on a per-beam basis), each time the transmit beam is changed, the device may apply different DPD coefficients to account for the non-linearity of the array configuration associated with the new beam.

A method for wireless communication at a wireless device is described. The method may include applying a first set of digital pre-distortion coefficients to a set of multiple antenna elements to form a first transmit beam, determining to switch from using the first transmit beam to using a second transmit beam that is different from the first transmit beam, applying a second set of digital pre-distortion coefficients to the set of multiple antenna elements to form the second transmit beam, where the second set of digital pre-distortion coefficients is different from the first set of digital pre-distortion coefficients, and transmitting signaling using the second transmit beam based on applying the second set of digital pre-distortion coefficients.

An apparatus for wireless communication at a wireless device is described. The apparatus may include a processor, memory coupled with the processor, and instructions stored in the memory. The instructions may be executable by the processor to cause the apparatus to apply a first set of digital pre-distortion coefficients to a set of multiple antenna elements to form a first transmit beam, determine to switch from using the first transmit beam to using a second transmit beam that is different from the first transmit beam, apply a second set of digital pre-distortion coefficients to the set of multiple antenna elements to form the second transmit beam, where the second set of digital pre-distortion coefficients is different from the first set of digital pre-distortion coefficients, and transmit signaling using the second transmit beam based on applying the second set of digital pre-distortion coefficients.

Another apparatus for wireless communication at a wireless device is described. The apparatus may include means for applying a first set of digital pre-distortion coefficients to a set of multiple antenna elements to form a first transmit beam, means for determining to switch from using the first transmit beam to using a second transmit beam that is different from the first transmit beam, means for applying a second set of digital pre-distortion coefficients to the set of multiple antenna elements to form the second transmit beam, where the second set of digital pre-distortion coefficients is different from the first set of digital pre-distortion coefficients, and means for transmitting signaling using the second transmit beam based on applying the second set of digital pre-distortion coefficients.

A non-transitory computer-readable medium storing code for wireless communication at a wireless device is described. The code may include instructions executable by a processor to apply a first set of digital pre-distortion coefficients to a set of multiple antenna elements to form a first transmit beam, determine to switch from using the first transmit beam to using a second transmit beam that is different from the first transmit beam, apply a second set of digital pre-distortion coefficients to the set of multiple antenna elements to form the second transmit beam, where the second set of digital pre-distortion coefficients is different from the first set of digital pre-distortion coefficients, and transmit signaling using the second transmit beam based on applying the second set of digital pre-distortion coefficients.

Some examples of the method, apparatuses, and non-transitory computer-readable medium described herein may further include operations, features, means, or instructions for selecting, from a set of multiple digital pre-distortion coefficient sets, the second set of digital pre-distortion coefficients corresponding to the second transmit beam.

Some examples of the method, apparatuses, and non-transitory computer-readable medium described herein may further include operations, features, means, or instructions for determining the set of multiple digital pre-distortion coefficient sets based on a calibration process that identifies non-linearity characteristics of the set of multiple antenna elements for a set of multiple transmit beams including the first transmit beam and the second transmit beam.

In some examples of the method, apparatuses, and non-transitory computer-readable medium described herein, the calibration process may include operations, features, means, or instructions for performing a digital pre-distortion coefficient calibration for each of the set of multiple transmit beams based on a dynamic calibration schedule that occurs while the wireless device may be operating.

In some examples of the method, apparatuses, and non-transitory computer-readable medium described herein, the calibration process may include operations, features, means, or instructions for performing a digital pre-distortion coefficient calibration for each of the set of multiple transmit beams based on powering on the wireless device.

In some examples of the method, apparatuses, and non-transitory computer-readable medium described herein, the set of multiple antenna elements may be grouped into a set of multiple radio frequency modules and each antenna element of the set of multiple antenna elements may be associated with a power amplifier.

In some examples of the method, apparatuses, and non-transitory computer-readable medium described herein, the first transmit beam may be associated with a first direction and the second transmit beam may be associated with a second direction that may be different from the first direction.

In some examples of the method, apparatuses, and non-transitory computer-readable medium described herein, the first set of digital pre-distortion coefficients and the second set of digital pre-distortion coefficients may be applied by a single digital pre-distortion engine that may be common to the set of multiple radio frequency modules.

In some examples of the method, apparatuses, and non-transitory computer-readable medium described herein, the wireless device may be a base station.

In some examples of the method, apparatuses, and non-transitory computer-readable medium described herein, the wireless device may be a user equipment.

DETAILED DESCRIPTION

Figure 1:
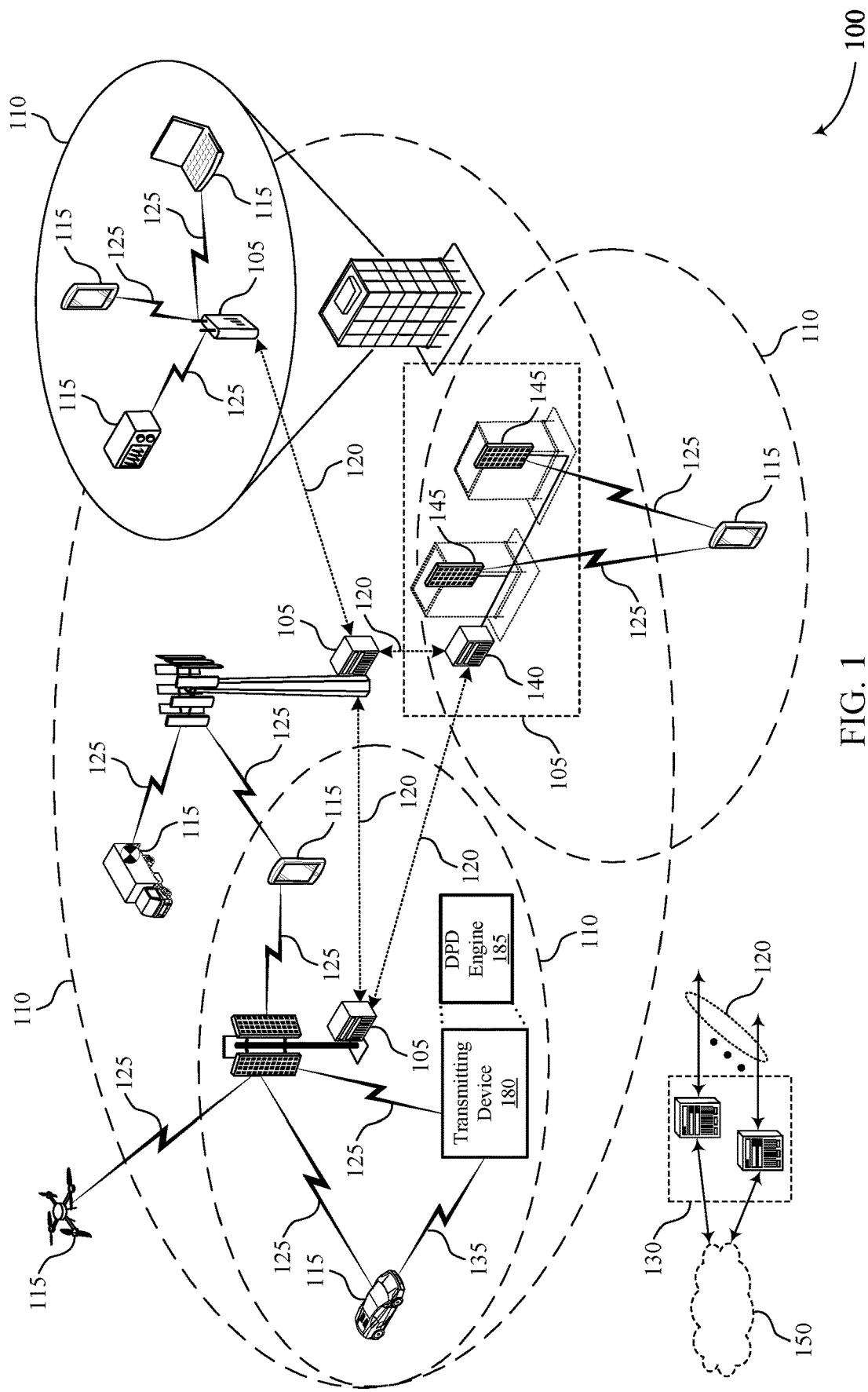
FIG. 1 illustrates an example of a wireless communications system that supports beam dependent digital pre-distortion (DPD) in accordance with aspects of the present disclosure.

Some wireless communications systems may include communication devices, such as a user equipment (UE) and a base station (e.g., an eNodeB (eNB), a next-generation NodeB or a giga-NodeB, either of which may be referred to as a gNB, or some other base station), that may support beamforming techniques. A transmitting device, such as a base station or a UE, may include an antenna array with a number of antenna elements that the transmitting device may use to support beamforming of communications with a receiving device. Beamforming may be achieved by combining signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. Each antenna element may be associated with non-linear components, e.g., power amplifiers (PAs), such that the radiated power from each antenna element may be adjusted. As such, the utilization efficiency of radiated power may affect wireless communications system design. For example, the transmitting device may contain non-linear components such as high-power PAs with limited linear dynamic range. That is, the transmitting device may transmit beamformed signaling using a number of antenna elements but the signaling may be distorted due to a high peak to average power ratio (PAPR) at higher power levels due to the non-linear characteristics of the power amplifier associated with each antenna element.

There may be a number of types of distortion including in-band distortion and out-band distortion. For example, in-band distortion may be caused by an uncorrelated component of the non-linear output. That is, the signaling waveform transmitted by the transmitting device may be distorted as it is transmitted—however—the distortions may remain within a frequency band in which the transmitting device is configured to transmit. In-band distortion may affect link performance and may affect mutual information or/and error vector magnitude.

Out-band distortion may also be caused by an uncorrelated component of the non-linear output. That is, the signaling waveform transmitted by the transmitting device may be distorted as it is transmitted, however, out-band distortions may interfere with frequency bands adjacent to the frequency band in which the transmitting device is configured to transmit. This may also be referred to as out of band (OOB) adjacent channel interference (ACI). The ACI may indicate how much an adjacent channel is polluted (e.g., interfered with) by the transmitted signaling.

To avoid distortion, power back-off (BO) may be introduced, however the higher power BO may be associated with less power efficiency resulting in less power being transmitted to the receiving device. Additionally or alternatively, digital pre-distortion (DPD) may be implemented in the transmitter's digital front end. Using the DPD, the degree of distortion may be mitigated and may be limited to a target distortion level, while the power BO may be minimized. This may improve PA efficiency.

DPD may increase linearity or compensate for non-linearity in PAs. For example, a DPD engine may calculate and apply a set of DPD coefficients to the antenna array of the transmitter which may mitigate distortion caused by PAs. In some wireless communications systems, (e.g., such a mmW communications systems) DPD may be supported by a single DPD engine which may apply DPD coefficients to an array of PA elements. In some cases, the PA elements may experience similar non-linearity characteristics which may produce a similar effect to wireless communications systems in which a DPD engine supports a single PA. However, in practicality, each PA element may experience different non-linearity characteristics due to different physical layouts and beamforming, which generates different loading per antenna/PA element pair, especially in examples in which tapering may be applied.

In some examples, a DPD engine may support a small number of PA elements located on a single RF or antenna module. In this example the PA non-linearity coefficients may be similar. However, in some other examples, a DPD engine may support a large number of PA elements (e.g., 128 elements or more) distributed across multiple modules. In such examples, the non-linearity characteristics may differ due to inherent inconsistencies between each of the PAs and due to different loading configurations of the antenna elements for each configured beam. The different loading configurations may affect the non-linearity performance of each PA element as non-linearity differs as a function of power output. The non-linearity characteristics of each PA may aggregate based on the large number of PA elements in each beam configuration and the DPD performance may vary. In other words, the number of antenna elements being located on different antenna modules may cause different DPD performance (due to different loading configurations) per beam.

To compensate for the non-linearities caused by beam-formed communications, the transmitting device may perform a DPD coefficient calibration for each transmit beam. In some examples, the transmitting device may perform a DPD coefficient calibration in a factory setting upon initialization (e.g., upon a first powering up of the transmitting device). In some examples, the transmitting device may perform a DPD coefficient calibration while deployed (e.g., while in operation) based on a schedule. The transmitting device may determine a DPD coefficient set for each configured beam based on performing the DPD coefficient calibration. For example, the DPD coefficient set may mitigate a non-linearity caused by each PA in the beam configuration.

The DPD engine of the transmitting device may apply a set of DPD coefficients to the antenna elements when the transmitting device uses a transmit beam. The set of DPD coefficients may be specific to the transmit beam. Based on more or more factors, the transmitting device may determine to switch from using the first transmit beam for communications with a receiving device, such as a base station or a UE, to using a second transmit beam that is different from the first transmit beam and may select a second set of DPD coefficients that correspond to the second transmit beam configuration. The DPD engine of the transmitting device may apply the second set of DPD coefficients to the plurality of antenna elements based on the transmitting device using the second transmit beam. The second set of DPD coefficients may be different from the first set of DPD coefficients. The transmitting device may transmit signaling using the second transmit beam based on the DPD engine applying the second set of DPD coefficients. In such a way, the transmitting device may be able to calibrate and apply beam-specific DPD thereby increasing coverage and conserving energy.

Aspects of the disclosure are initially described in the context of wireless communications systems. Device and process flows are then described. Aspects of the disclosure are further illustrated by and described with reference to apparatus diagrams, system diagrams, and flowcharts that relate to beam dependent DPD.

FIG. 1 illustrates an example of a wireless communications system 100 that supports beam dependent DPD in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A transmitting device 180, which may be an example of a base station 105 or a UE 115, may be equipped with a PA corresponding to each of its antenna elements and a single DPD engine 185 common to each of a plurality of RF modules in which the antenna elements and PAs are distributed. When beamforming, the transmitting device 180 may experience non-linearities associated with the operations of each power amplifier. For example, the transmitting device 180 may be configured to transmit using a plurality of beams (e.g., using a single beam of the plurality of beams at a time) and each beam may be formed based on a load of each antenna element. In such examples, each beam may be associated with a non-linearity caused by the antenna element configuration and each beam non-linearity may be different. To compensate for the non-linearities caused by beamformed communications, the transmitting device 180 may perform a DPD coefficient calibration for each of the plurality of transmit beams. In some examples, the transmitting device 180 may perform a DPD coefficient calibration in a factory setting upon initialization (e.g., upon a first powering up of the transmitting device). Additionally or alternatively, the transmitting device 180 may perform a DPD coefficient calibration while deployed (e.g., while in operation) based on a schedule. Based on the DPD coefficient calibration, the transmitting device 180 may determine a DPD coefficient set for each configured beam. For example, the DPD coefficient set may account for a non-linearity caused by each PA in the beam configuration.

The DPD engine 185 of the transmitting device 180 may apply a first set of DPD coefficients to the antenna elements when the transmitting device 180 forms a first transmit beam. Based on more or more factors, the transmitting device 180 may determine to switch from using the first transmit beam for communications with a receiving device, such as a base station 105 or a UE 115, to using a second transmit beam that is different from the first transmit beam and may select a set of DPD coefficients that correspond to the second transmit beam configuration. The DPD engine 185 of the transmitting device 180 may apply a second set of DPD coefficients to the plurality of antenna elements when the transmitting device forms the second transmit beam. The second set of DPD coefficients may be different from the first set of DPD coefficients. The transmitting device 180 may transmit signaling using the second transmit beam based on the DPD engine 185 applying the second set of DPD coefficients.

Figure 2:
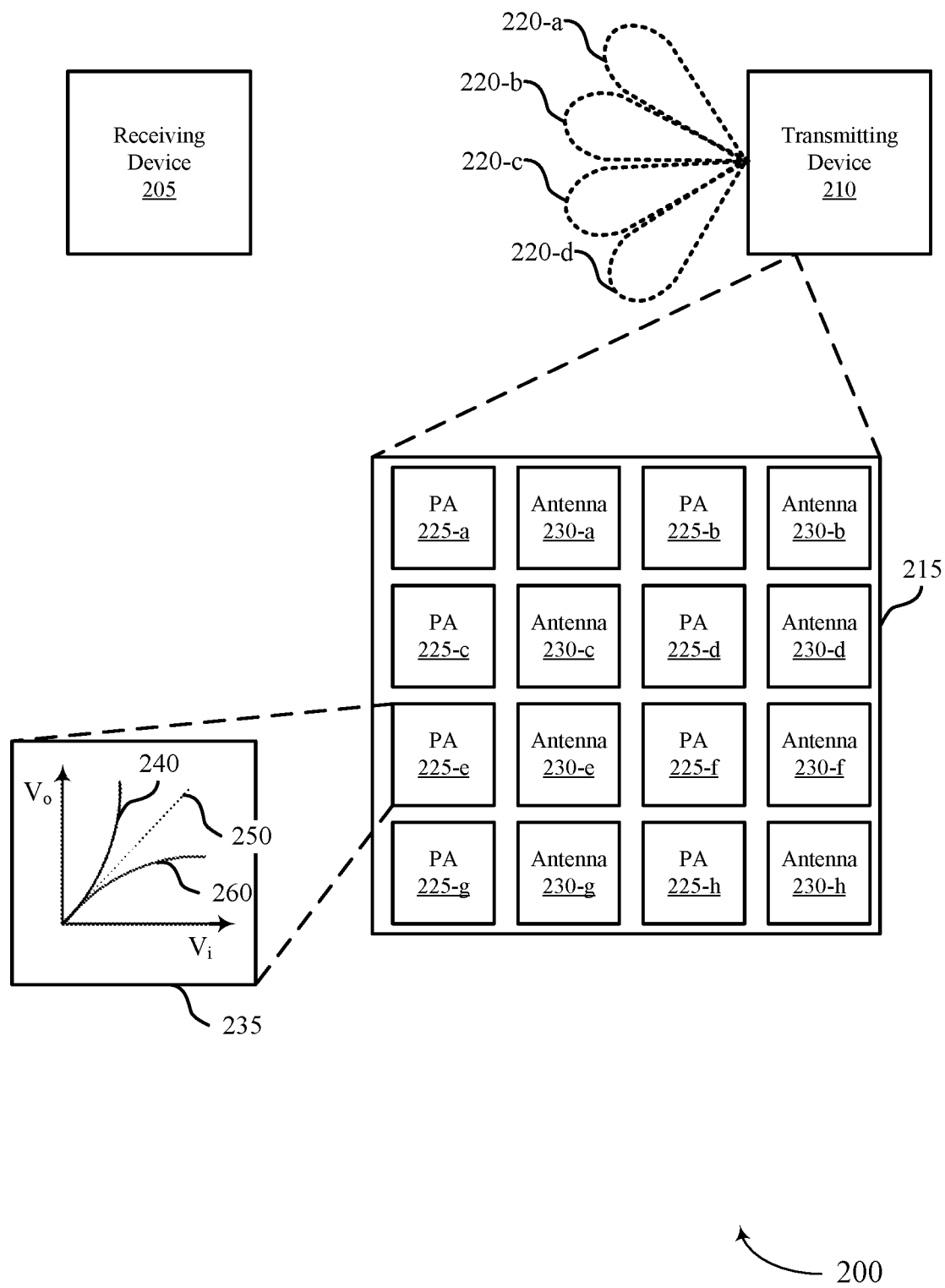
FIG. 2 illustrates an example of a wireless communications system that supports beam dependent DPD in accordance with aspects of the present disclosure.

FIG. 2 illustrates an example of a wireless communications system 200 that supports beam dependent DPD in accordance with aspects of the present disclosure. In some examples, the wireless communications system 200 may implement aspects of wireless communications systems 100. Wireless communications system 200 includes a receiving device 205 which may be an example of a UE 115 or base station 105 as described with reference to FIG. 1. In some examples, the receiving device 205 may be an example of a relay device, IAB nodes, or other network equipment. Wireless communications system 200 also includes a transmitting device 210 which may be an example of a transmitting device 180 as described with reference to FIG. 1, which may also be an example of a base station 105 or a UE 115, among other examples. In some examples, the transmitting device 210 may be an example of a relay device, integrated access and backhaul (IAB) nodes, or other network equipment.

The transmitting device 210 may be configured to transmit using a number of beamformed transmit beams 220. The transmitting device 210 may include an antenna module 215. In some examples, while not shown, the transmitting device 210 may include more than one antenna module 215. For example, the transmitting device 210 may include 8 antenna modules in some implementations. The antenna module 215 may include a number of PAs 225 and antenna elements 230. While FIG. 2 explicitly depicts an antenna module having eight antenna elements 230 and eight PAs 225, it is to be understood that the example is for illustrative purpose and is not limiting. A transmitting device 210 may have any number of PA 225 and antenna 230 as may an individual antenna module 215.

Each PA 225 may be associated with a non-linearity at certain radiated power levels. For example, graph 235 shows an example non-linearity caused by a PA 225-e, for example. The graph 235 shows a signal in the context of an input signal $V_i$ and an output signal, $V_o$. That is, the signal may be received at the PA 225-e at a voltage, $V_i$ and may be transmitted by the PA 225-e at a voltage, $V_o$. If the PA 225-e were an ideal PA, $V_i$ would be linearly related to $V_o$. For example, curve 250 may be an example of a linear relationship between $V_i$ and $V_o$. However, in many cases, PAs may cause non-linear effects. For example, the PA 225-e may cause a non-linear relationship 260 between $V_i$ and $V_o$ which may be referred to as distortion. Likewise, other PAs 225 may cause non-linear effects, however such effects may be different from the non-linear effects caused by PA 225-e especially when considering beamforming configurations. For example, each PA element 225 may experience different non-linearity characteristics due to different physical layouts and beamforming configurations, which generates different loading configurations per antenna/PA element pair.

To avoid such distortion, DPD may be implemented. For example, a set of DPD coefficients may be applied to a signal input such that the signal input, $V_i$ at the PA 225 may be linearly related to $V_o$. However, a single set of DPD coefficients may be insufficient to linearize the signal responses at each PA 225 because different loading configurations for different beams 220 may affect the non-linearity performance of each PA element as non-linearity differs as a function of power output. That is, each PA 225 may have a different setting for each beam configuration 220. The non-linearity characteristics of each PA 225 may aggregate based on the number of PA elements. In other words, the number of antenna elements being located on different antenna modules may cause the set of DPD coefficients to perform differently (due to different loading configurations) per beam.

To compensate for the non-linearities caused by beamformed communications, the transmitting device 210 may perform a DPD coefficient calibration for each transmit beam 220. In some examples, the transmitting device 210 may perform a DPD coefficient calibration in a factory setting upon initialization (e.g., upon a first powering up of the transmitting device 210). In some examples, the transmitting device may perform a DPD coefficient calibration while deployed (e.g., while in operation) based on a schedule. The transmitting device 210 may determine a DPD coefficient set for each configured beam 220 based on performing the DPD coefficient calibration. A DPD coefficient calibration may include transmitting signaling using a directional beam at a known power or orientation (or other measurable characteristic) and then measuring the received power or orientation (or other measurable characteristic) to assess the distortion caused by the non-linearity. Based on this measured distortion, a set of DPD coefficients may be selected that compensates for the distortion. This procedure may be repeated for each directional beam that is formable by the transmitting device. For example, the DPD coefficient set may mitigate a non-linearity caused by each PA 225 in the beam configuration.

The transmitting device 210 may apply a set of DPD coefficients to a signal transmitted to the antenna elements 230 when the transmitting device 210 uses a transmit beam 220-a. The set of DPD coefficients may be specific to the transmit beam 220-a. Based on more or more factors, the transmitting device 210 may determine to switch from using the first transmit beam 220-a for communications with the receiving device 205, to using a second transmit beam 220-b that is different from the first transmit beam 220-a and may select a second set of DPD coefficients that correspond to the second transmit beam configuration 220-b. The transmitting device 210 may apply the second set of DPD coefficients to the plurality of antenna elements 230 (e.g., may apply the DPD coefficients to a signal before transmitting the signal using the antenna elements 230 via the PAs 225) based on the transmitting device 210 determining to use the second transmit beam 220-b. The second set of DPD coefficients may be different from the first set of DPD coefficients. The transmitting device 210 may transmit signaling using the second transmit beam 220-b based on the DPD engine applying the second set of DPD coefficients. In such a way, the transmitting device 210 may be able to calibrate and apply beam-specific DPD thereby increasing coverage and conserving energy by linearizing the signal output by the antenna 230. For example, the DPD may apply a curve 240 to the non-linear relationship 260 such that the signal output is more linear.

Figure 3A:
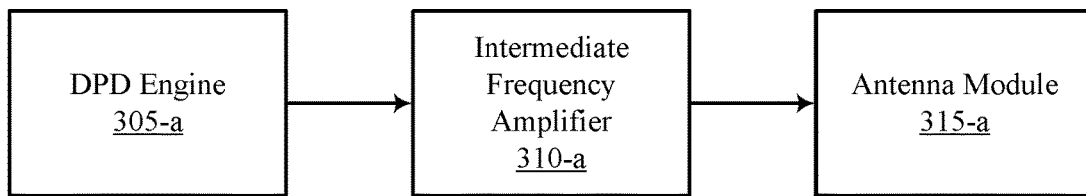
FIGS. 3A and 3B each illustrate an example of a device that support beam dependent DPD in accordance with aspects of the present disclosure.

FIG. 3A illustrates an example of a device 301 that supports beam dependent DPD in accordance with aspects of the present disclosure. The device 301 may be an example of portions of a device architecture which may be implemented in, for example, a UE 115, a relay device, IAB nodes, or other network equipment as described with reference to FIG. 1. The device 301 may include a DPD engine 305-a, an intermediate frequency amplifier 310-a, and an RF module 315-a. The RF module 315-a may include a number of antenna elements with a corresponding number of PAs and an internal splitter for splitting signals received from the intermediate frequency (IF) amplifier 310-a among the antenna elements.

The DPD engine 305-a may transmit a set of DPD coefficients to the intermediate frequency amplifier 310-a. The IF amplifier 310-a may amplify the signal frequencies and may transmit the signal to the antenna module 315-a. The antenna module 315-a may be configured to transmit the signal based on a beamformed configuration of the antenna elements and may transmit the signal based on the DPD coefficients received from the DPD engine 305-a. In such a way, the device 301 may mitigate non-linearity effects caused by the PAs of the antenna module 315-a.

Figure 3B:
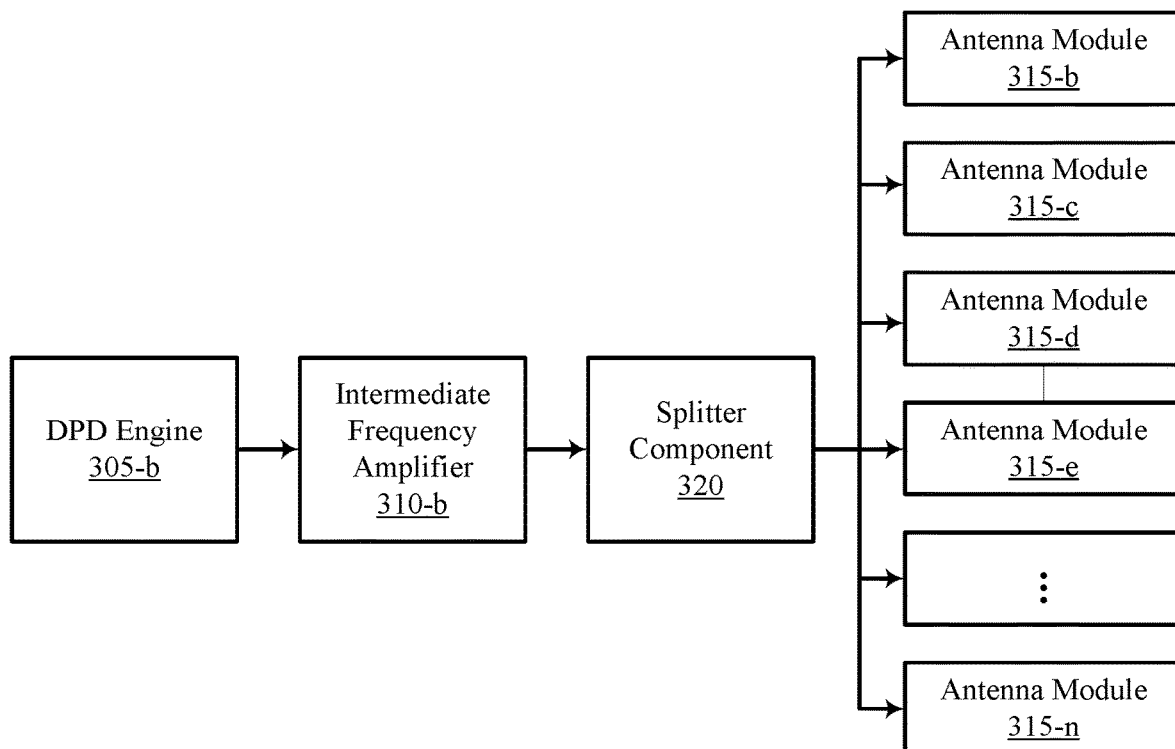

FIG. 3B illustrates an example of a device 302 that supports beam dependent DPD in accordance with aspects of the present disclosure. The device 302 may be an example of portions of a device architecture which may be implemented in, for example, a base station 105, a relay device, IAB nodes, or other network equipment, which are described with reference to FIG. 1. The device 302 may include a DPD engine 305-b, an IF amplifier 310-b, a splitter component 320, and a number of antenna modules 315-b through 315-n. The antenna modules 315 may include a number of antenna elements with a corresponding number of PAs.

With reference to FIG. 3A, the RF module 315-a may be associated with an RF chip which may affect the non-linearity characteristics of the antenna elements. For example, while each power amplifier and thus each beam configuration of the RF module 315-a may have different non-linearity characteristics, such differences may be insignificant when compared to devices with multiple RF modules (e.g., and thus multiple RF chips) such as device 302. With reference to FIG. 3B, the non-linearity condition of the device 302 may be amplified as the antenna elements are distributed across multiple RF chips. A transmitting device may include a device 302 which may have, for example, 128 elements (e.g., 128 PAs corresponding to each of 128 antennas), which may be distributed across a number of antenna modules among a number of RF chips. This may cause an increased non-linearity characteristic based on an aggregated distortion from each of the RF chips. Additionally, the aggregated distortion may differ based on each beam configuration. For example, the aggregated distortion caused by the antenna module configuration transmitting a first beam may be different than when transmitting a second beam. With reference to FIG. 3A, a device 301 may have a smaller number of antenna elements located on a single RF chip which may cause a lesser or more predictable distortion effect, however, the device 301 may still benefit from a per-beam DPD coefficient calibration even if less significantly than would device 302.

Figure 4:
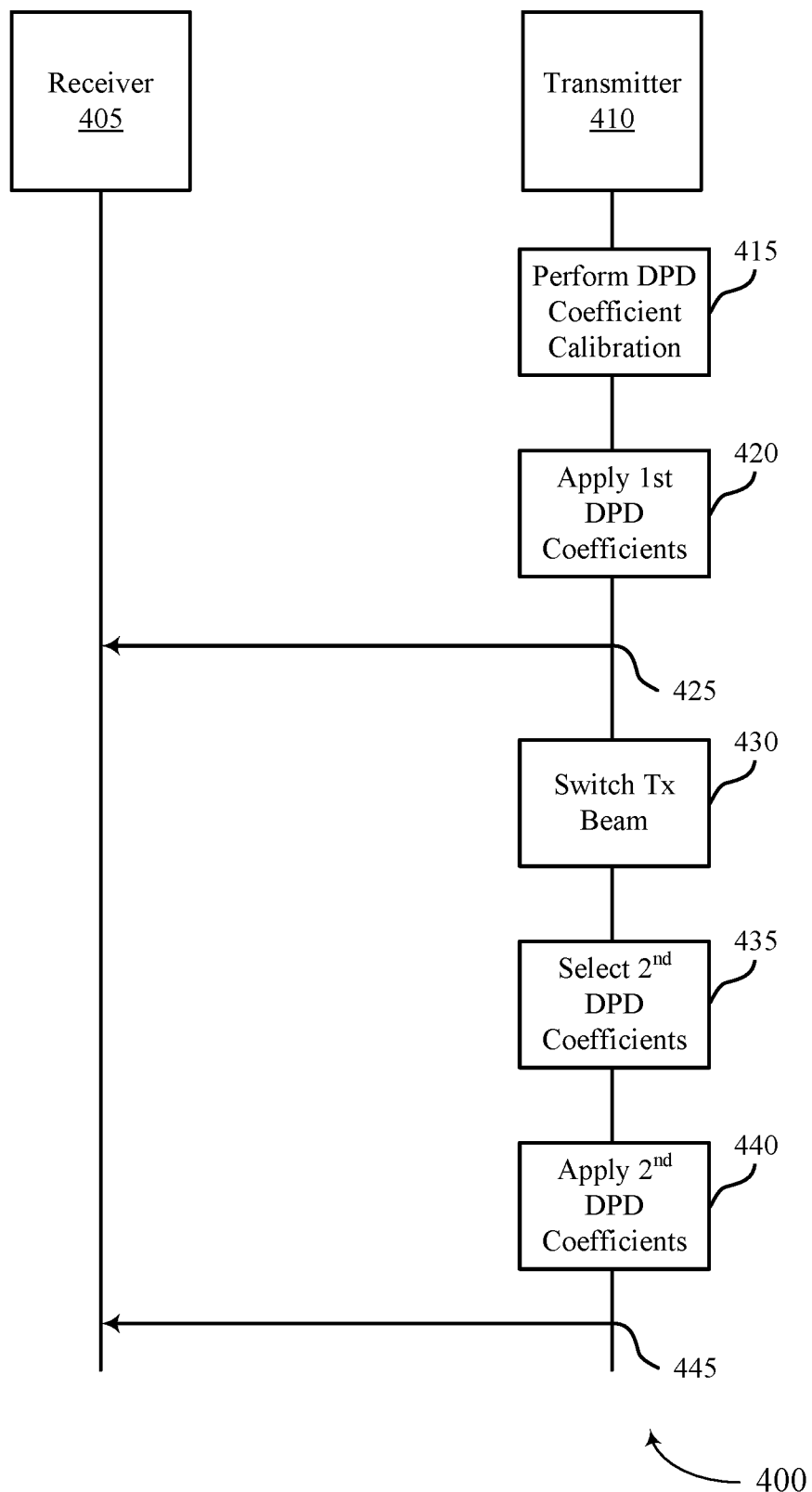
FIG. 4 illustrates an example of a process flow that supports beam dependent DPD in accordance with aspects of the present disclosure.

FIG. 4 illustrates an example of a process flow 400 that supports beam dependent DPD in accordance with aspects of the present disclosure. In some examples, the process flow 400 may implement aspects of wireless communications systems 100 and/or 200. Process flow 400 includes a receiving device 405 which may be an example of a UE 115, base station 105, a relay device, IAB nodes, or other network equipment as described with reference to FIG. 1. Process flow 400 also includes a transmitting device 410 which may be an example of a transmitting device 180 as described with reference to FIG. 1 or a transmitting device 210 as described with reference to FIG. 2 each of which may be an example of a base station 105 or a UE 115, among other examples.

In the following description of the process flow 400, the operations between the receiving device 405 and the transmitting device 410 may be transmitted in a different order than the exemplary order shown, or operations performed by the transmitting device 410 may be performed in different orders, at different times, or by different entities. Certain operations may also be left out of the process flow 400, or other operations may be added to the process flow 400. It is to be understood that while the transmitting device 410 is shown performing a number of the operations of process flow 400, any wireless device may perform the operations shown. Process flow 400 may illustrate a procedure for beam dependent digital pre-distortion calibration.

At 415, the transmitting device 410 may perform a DPD coefficient calibration for each of the plurality of transmit beams. In some examples, the transmitting device 410 may perform a DPD coefficient calibration in a factory setting upon initialization (e.g., upon a first powering up of the transmitting device). For example, an initial DPD coefficient calibration may be performed as part of initializing the transmitting device 410 or as part of manufacturing transmitting device 410. In some examples, the transmitting device 180 may perform a DPD coefficient calibration in an online setting (e.g., when deployed, while in operation, etc.) based on a schedule. The schedule, for example may be determined based on a number of factors including an age of the transmitting device 410, locational conditions of the transmitting device 410 (e.g., ambient temperature, day/night temperature fluctuations, among other examples), usage of the transmitting device 410, etc. In some examples, the schedule may be dynamic and may change throughout the lifetime of the transmitting device 410. Based on the DPD coefficient calibration, the transmitting device 410 may determine a DPD coefficient set for each configured transmit beam. For example, the DPD coefficient set may account for a non-linearity caused by each RF module (e.g., including a number of antenna element/PA pairs) in each beam configuration. The calibration process may include calculating a set of coefficients based on the non-linearity characteristics of the RF modules or the individual PAs in each beam configuration, which on a module-by-module (e.g., or PA element-by-PA element) basis may be different for each beam configuration.

At 420, the transmitting device may determine to communicate with the receiving device 405 using a first transmit beam. The transmitting device 410 may select, and a DPD engine of the transmitting device 410 may apply, a corresponding first set of DPD coefficients to the antenna elements in the first transmit beam configuration. The corresponding first set of DPD coefficients may be calculated during the calibration process and may mitigate non-linearities caused by the antenna element configuration associated with the first transmit beam. For example, the corresponding first set of DPD coefficients may correspond to non-linearities caused by operational characteristics (e.g., transmit phase, load, power, among other examples) of each antenna element and the corresponding PA that form the first transmit beam.

At 425, the transmitting device 410 may transmit signaling to the receiving device 405 using the first transmit beam based on the DPD engine applying the first set of DPD coefficients to the antenna elements.

At 430, and based on a number of factors, the transmitting device 410 may determine to switch transmit beams. For example, the transmitting device may determine to communicate with the receiving device 405 using a second transmit beam.

At 435, the transmitting device may select a set of DPD coefficients that correspond to the second transmit beam configuration (e.g., a second set of DPD coefficients). The second set of DPD coefficients may be selected from the number of beam-dependent DPD coefficient sets calculated during the DPD coefficient calibration process. For example, the corresponding second set of DPD coefficients may correspond to non-linearities caused by operational characteristics (e.g., transmit phase, load, power, among other examples) of each antenna element and the corresponding PA that form the second transmit beam.

At 440, the transmitting device 410 may apply the corresponding second set of DPD coefficients to the antenna elements in the second transmit beam configuration. The corresponding second set of DPD coefficients, when applied, may mitigate non-linearities caused by the antenna element configuration associated with the second transmit beam. In some examples, applying a set of DPD coefficients (e.g., applying any of the number of beam-dependent DPD coefficient sets) may include applying the DPD coefficients to the operations of the antenna elements, or to the operations of the PAs, or to the operations of the RF modules which each include a number of antenna element/PA pairs. Applying the set of DPD coefficients may additionally or alternatively include applying the DPD coefficients to a processing procedure prior to or after the PAs are implemented.

At 445, the transmitting device 410 may transmit second signaling to the receiving device 405 using the second transmit beam based on the DPD engine applying the second set of DPD coefficients to the antenna elements.

Figure 5:
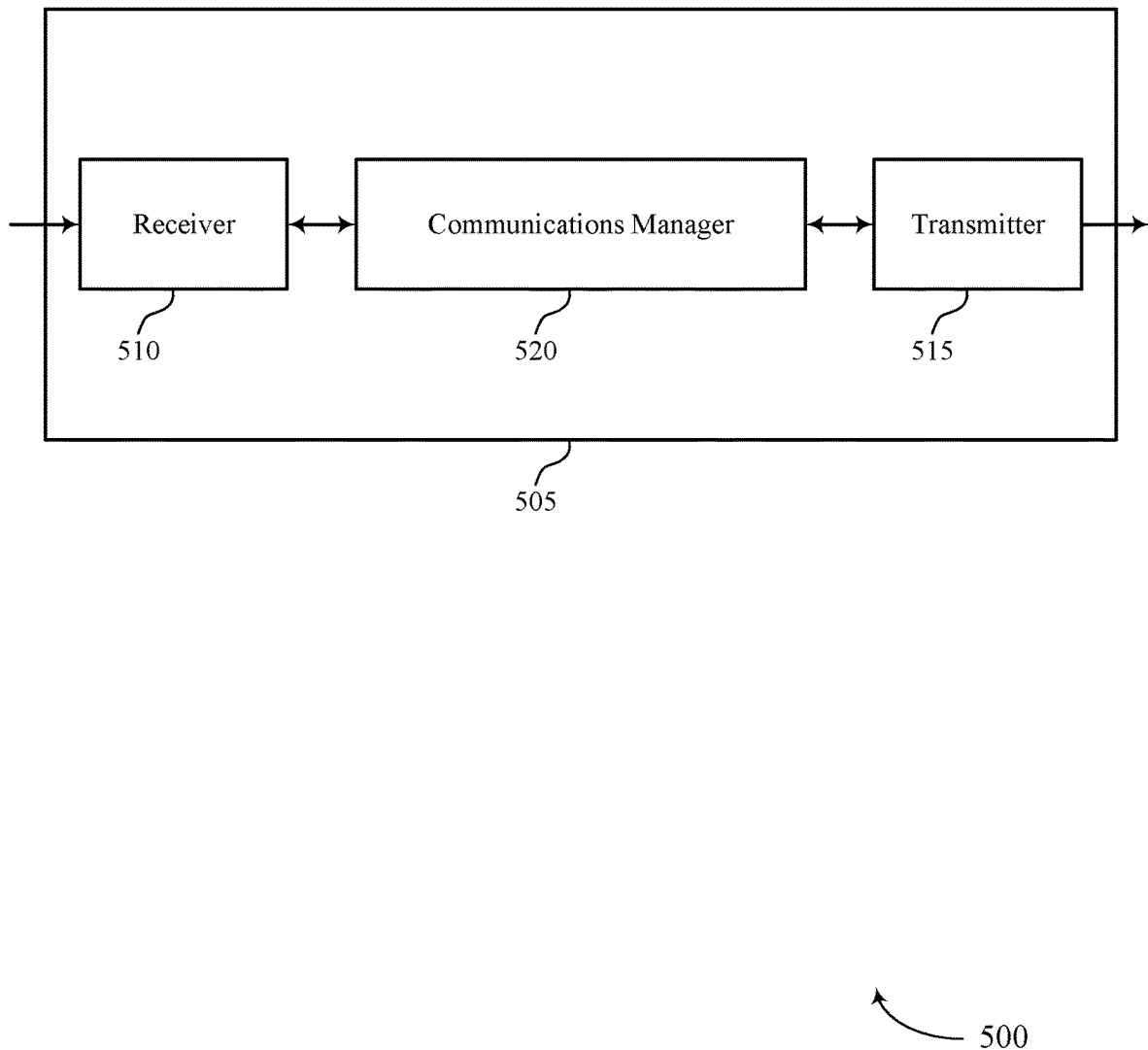
FIGS. 5 and 6 show block diagrams of devices that support beam dependent DPD in accordance with aspects of the present disclosure.

FIG. 5 shows a block diagram 500 of a device 505 that supports beam dependent DPD in accordance with aspects of the present disclosure. The device 505 may be an example of aspects of a UE 115 or a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to beam dependent DPD). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to beam dependent DPD). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of beam dependent DPD as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a wireless device in accordance with examples as disclosed herein. For example, the communications manager 520 may be configured as or otherwise support a means for applying a first set of DPD coefficients to a set of multiple antenna elements to form a first transmit beam. The communications manager 520 may be configured as or otherwise support a means for determining to switch from using the first transmit beam to using a second transmit beam that is different from the first transmit beam. The communications manager 520 may be configured as or otherwise support a means for applying a second set of DPD coefficients to the set of multiple antenna elements to form the second transmit beam, where the second set of DPD coefficients is different from the first set of DPD coefficients.

The communications manager 520 may be configured as or otherwise support a means for transmitting signaling using the second transmit beam based on applying the second set of DPD coefficients.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption, and more efficient utilization of communication resources, among other examples.

Figure 6:
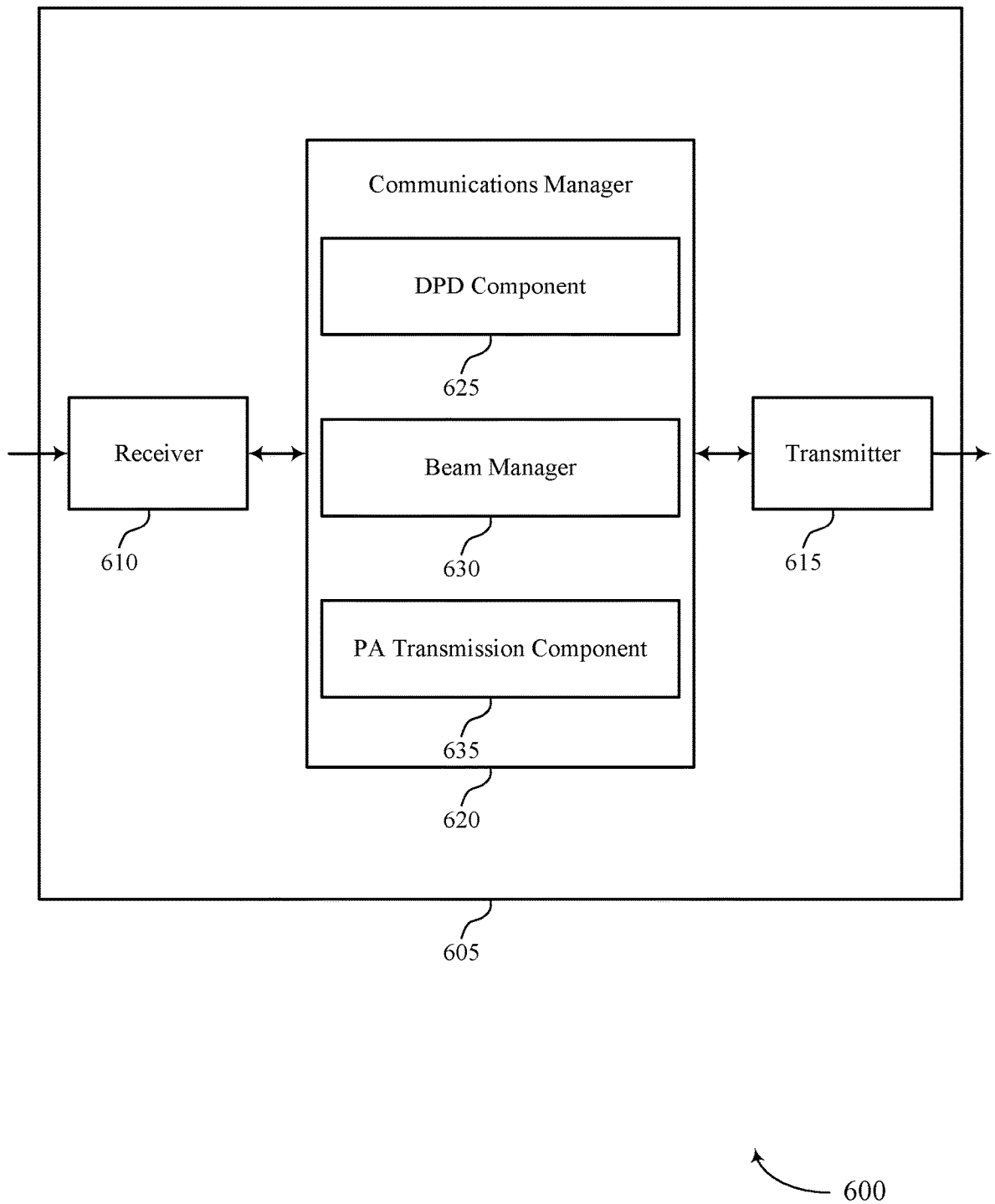

FIG. 6 shows a block diagram 600 of a device 605 that supports beam dependent DPD in accordance with aspects of the present disclosure. The device 605 may be an example of aspects of a device 505, a UE 115, or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to beam dependent DPD). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to beam dependent DPD). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of beam dependent DPD as described herein. For example, the communications manager 620 may include a DPD component 625, a beam manager 630, a PA transmission component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a wireless device in accordance with examples as disclosed herein. The DPD component 625 may be configured as or otherwise support a means for applying a first set of DPD coefficients to a set of multiple antenna elements to form a first transmit beam. The beam manager 630 may be configured as or otherwise support a means for determining to switch from using the first transmit beam to using a second transmit beam that is different from the first transmit beam. The DPD component 625 may be configured as or otherwise support a means for applying a second set of DPD coefficients to the set of multiple antenna elements to form the second transmit beam, where the second set of DPD coefficients is different from the first set of DPD coefficients. The PA transmission component 635 may be configured as or otherwise support a means for transmitting signaling using the second transmit beam based on applying the second set of DPD coefficients.

Figure 7:
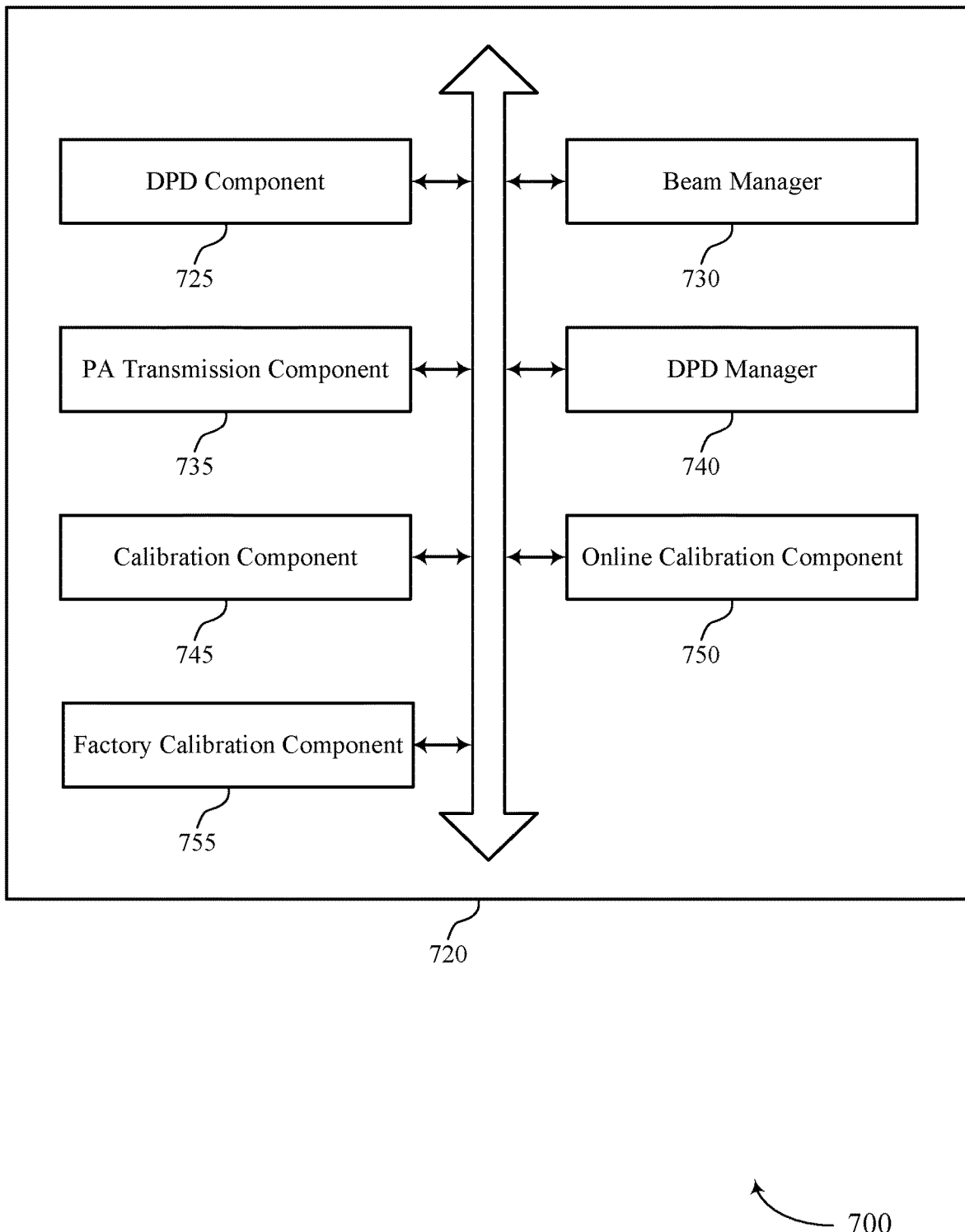
FIG. 7 shows a block diagram of a communications manager that supports beam dependent DPD in accordance with aspects of the present disclosure.

FIG. 7 shows a block diagram 700 of a communications manager 720 that supports beam dependent DPD in accordance with aspects of the present disclosure. The communications manager 720 may be an example of aspects of a communications manager 520, a communications manager 620, or both, as described herein. The communications manager 720, or various components thereof, may be an example of means for performing various aspects of beam dependent DPD as described herein. For example, the communications manager 720 may include a DPD component 725, a beam manager 730, a PA transmission component 735, a DPD manager 740, a calibration component 745, an online calibration component 750, a factory calibration component 755, or any combination thereof. Each of these components may communicate, directly or indirectly, with one another (e.g., via one or more buses).

The communications manager 720 may support wireless communication at a wireless device in accordance with examples as disclosed herein. The DPD component 725 may be configured as or otherwise support a means for applying a first set of DPD coefficients to a set of multiple antenna elements to form a first transmit beam. The beam manager 730 may be configured as or otherwise support a means for determining to switch from using the first transmit beam to using a second transmit beam that is different from the first transmit beam. In some examples, the DPD component 725 may be configured as or otherwise support a means for applying a second set of DPD coefficients to the set of multiple antenna elements to form the second transmit beam, where the second set of DPD coefficients is different from the first set of DPD coefficients. The PA transmission component 735 may be configured as or otherwise support a means for transmitting signaling using the second transmit beam based on applying the second set of DPD coefficients.

In some examples, the DPD manager 740 may be configured as or otherwise support a means for selecting, from a set of multiple DPD coefficient sets, the second set of DPD coefficients corresponding to the second transmit beam.

In some examples, the calibration component 745 may be configured as or otherwise support a means for determining the set of multiple DPD coefficient sets based on a calibration process that identifies non-linearity characteristics of the set of multiple antenna elements for a set of multiple transmit beams including the first transmit beam and the second transmit beam.

In some examples, to support calibration process, the online calibration component 750 may be configured as or otherwise support a means for performing a DPD coefficient calibration for each of the set of multiple transmit beams based on a dynamic calibration schedule that occurs while the wireless device is operating.

In some examples, to support calibration process, the factory calibration component 755 may be configured as or otherwise support a means for performing a DPD coefficient calibration for each of the set of multiple transmit beams based on powering on the wireless device.

In some examples, the set of multiple antenna elements are grouped into a set of multiple radio frequency modules.

In some examples, each antenna element of the set of multiple antenna elements is associated with a power amplifier.

In some examples, the first transmit beam is associated with a first direction and the second transmit beam is associated with a second direction that is different from the first direction.

In some examples, the first set of DPD coefficients and the second set of DPD coefficients are applied by a single DPD engine that is common to the set of multiple radio frequency modules.

In some examples, the wireless device is a base station. In some examples, the wireless device is a user equipment.

Figure 8:
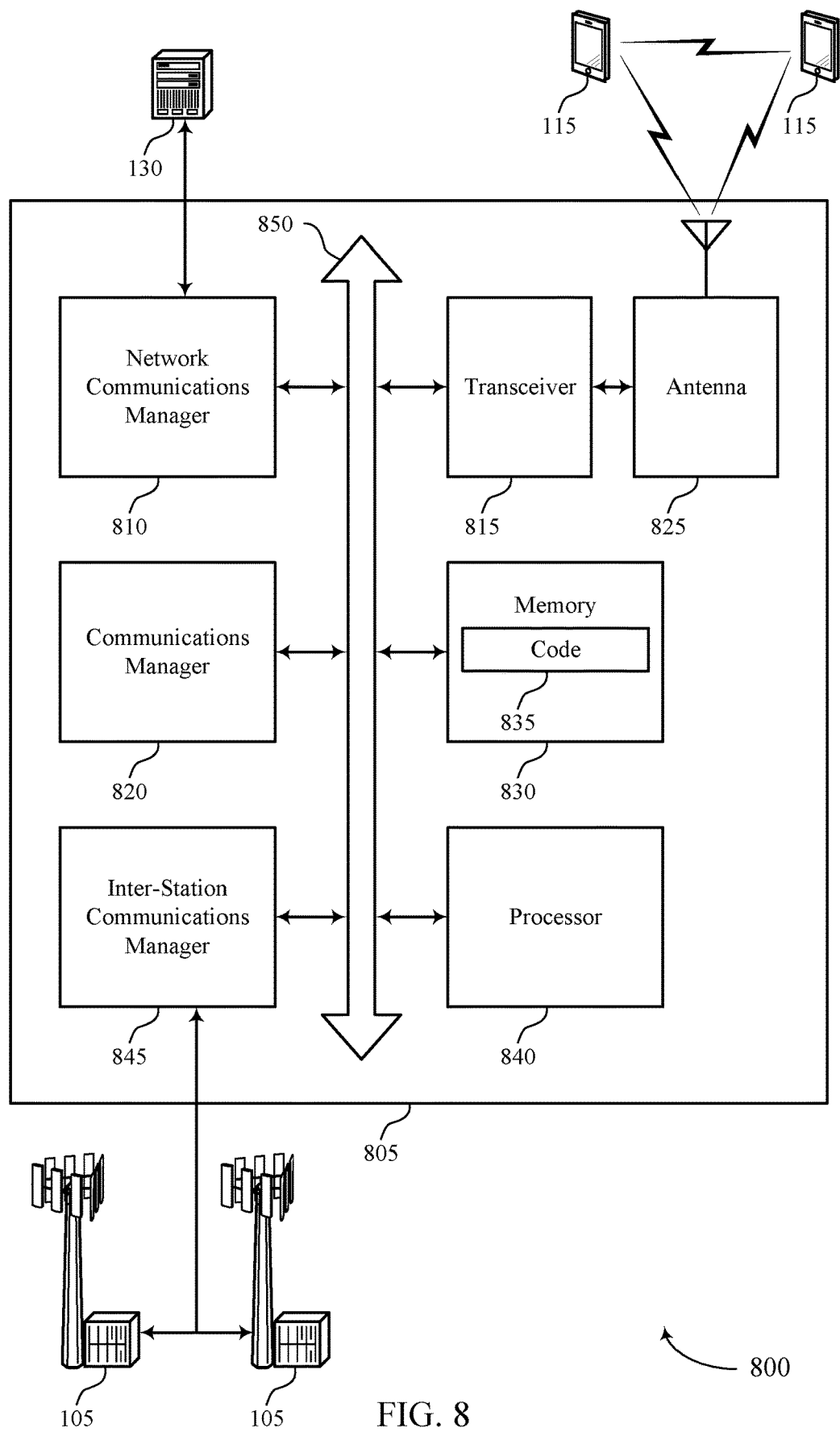
FIG. 8 shows a diagram of a system including a UE that supports beam dependent DPD in accordance with aspects of the present disclosure.

FIG. 8 shows a diagram of a system 800 including a device 805 that supports beam dependent DPD in accordance with aspects of the present disclosure. The device 805 may be an example of or include the components of a device 505, a device 605, or a UE 115 or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic input/output (I/O) system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting beam dependent DPD). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communication at a wireless device in accordance with examples as disclosed herein. For example, the communications manager 820 may be configured as or otherwise support a means for applying a first set of DPD coefficients to a set of multiple antenna elements to form a first transmit beam. The communications manager 820 may be configured as or otherwise support a means for determining to switch from using the first transmit beam to using a second transmit beam that is different from the first transmit beam. The communications manager 820 may be configured as or otherwise support a means for applying a second set of DPD coefficients to the set of multiple antenna elements to form the second transmit beam, where the second set of DPD coefficients is different from the first set of DPD coefficients. The communications manager 820 may be configured as or otherwise support a means for transmitting signaling using the second transmit beam based on applying the second set of DPD coefficients.

By including or configuring the communications manager 820 in accordance with examples as described herein, the device 805 may support techniques for improved communication reliability and coverage, reduced power consumption, longer battery life, or reduced interference, among other examples.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of beam dependent DPD as described herein, or the processor 840 and the memory 830 may be otherwise configured to perform or support such operations.

Figure 9:
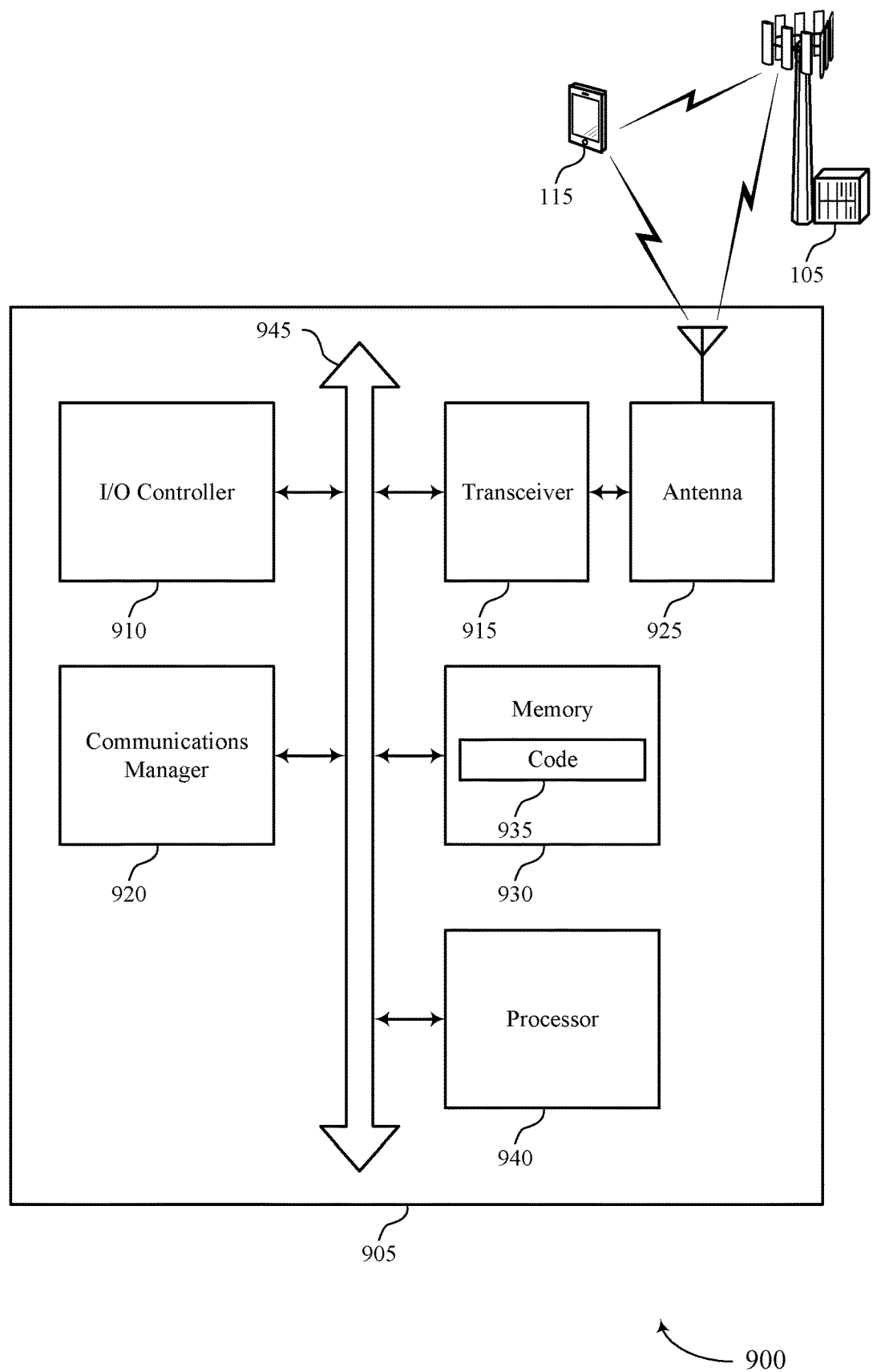
FIG. 9 shows a diagram of a system including a base station that supports beam dependent DPD in accordance with aspects of the present disclosure.

FIG. 9 shows a diagram of a system 900 including a device 905 that supports beam dependent DPD in accordance with aspects of the present disclosure. The device 905 may be an example of or include the components of a device 505, a device 605, or a UE 115 or a base station 105 as described herein. The device 905 may communicate wirelessly with one or more base stations 105, UEs 115, or any combination thereof. The device 905 may include components for bi-directional voice and data communications including components for transmitting and receiving communications, such as a communications manager 920, an I/O controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 515, a transmitter 615, a receiver 510, a receiver 610, or any combination thereof or component thereof, as described herein.

The memory 930 may include RAM and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting beam dependent DPD). For example, the device 905 or a component of the device 905 may include a processor 940 and memory 930 coupled to the processor 940, the processor 940 and memory 930 configured to perform various functions described herein.

The communications manager 920 may support wireless communication at a wireless device in accordance with examples as disclosed herein. For example, the communications manager 920 may be configured as or otherwise support a means for applying a first set of DPD coefficients to a set of multiple antenna elements to form a first transmit beam. The communications manager 920 may be configured as or otherwise support a means for determining to switch from using the first transmit beam to using a second transmit beam that is different from the first transmit beam. The communications manager 920 may be configured as or otherwise support a means for applying a second set of DPD coefficients to the set of multiple antenna elements to form the second transmit beam, where the second set of DPD coefficients is different from the first set of DPD coefficients. The communications manager 920 may be configured as or otherwise support a means for transmitting signaling using the second transmit beam based on applying the second set of DPD coefficients.

By including or configuring the communications manager 920 in accordance with examples as described herein, the device 905 may support techniques for improved communication coverage and reduced power consumption, among other examples.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of beam dependent DPD as described herein, or the processor 940 and the memory 930 may be otherwise configured to perform or support such operations.

Figure 10:
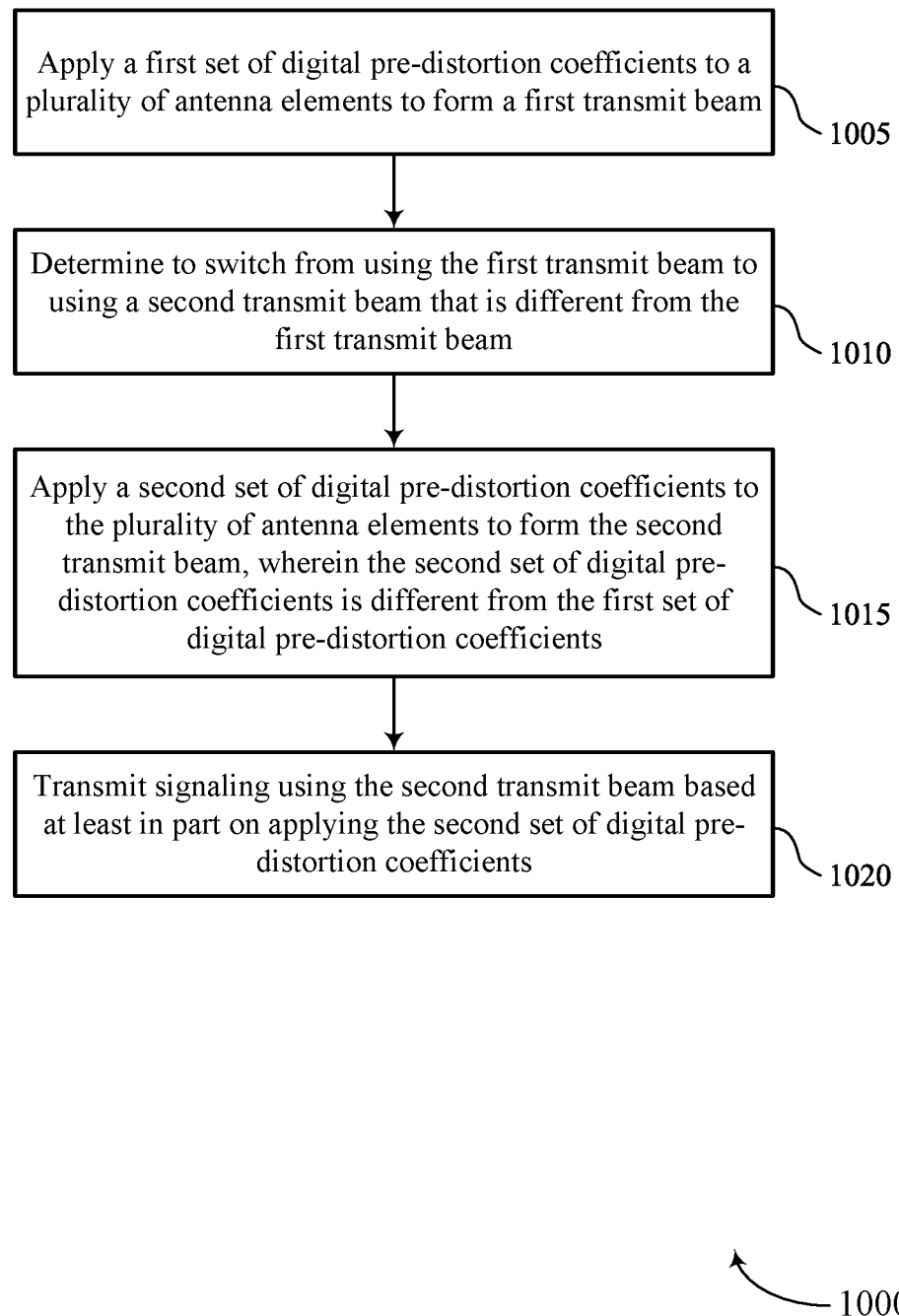
FIGS. 10 through 13 show flowcharts illustrating methods that support beam dependent DPD in accordance with aspects of the present disclosure.

FIG. 10 shows a flowchart illustrating a method 1000 that supports beam dependent DPD in accordance with aspects of the present disclosure. The operations of the method 1000 may be implemented by a transmitting device such as a UE 115 or a base station 105 or its components as described herein. For example, the operations of the method 1000 may be performed by device 505. In some examples, the device 505 may execute a set of instructions to control the functional elements of the device 505 to perform the described functions. Additionally or alternatively, the device 505 may perform aspects of the described functions using special-purpose hardware.

At 1005, the method may include applying a first set of DPD coefficients to a set of multiple antenna elements to form a first transmit beam. The operations of 1005 may be performed in accordance with examples as disclosed herein.

At 1010, the method may include determining to switch from using the first transmit beam to using a second transmit beam that is different from the first transmit beam. The operations of 1010 may be performed in accordance with examples as disclosed herein.

At 1015, the method may include applying a second set of DPD coefficients to the set of multiple antenna elements to form the second transmit beam, where the second set of DPD coefficients is different from the first set of DPD coefficients. The operations of 1015 may be performed in accordance with examples as disclosed herein.

At 1020, the method may include transmitting signaling using the second transmit beam based on applying the second set of DPD coefficients. The operations of 1020 may be performed in accordance with examples as disclosed herein.

Figure 11:
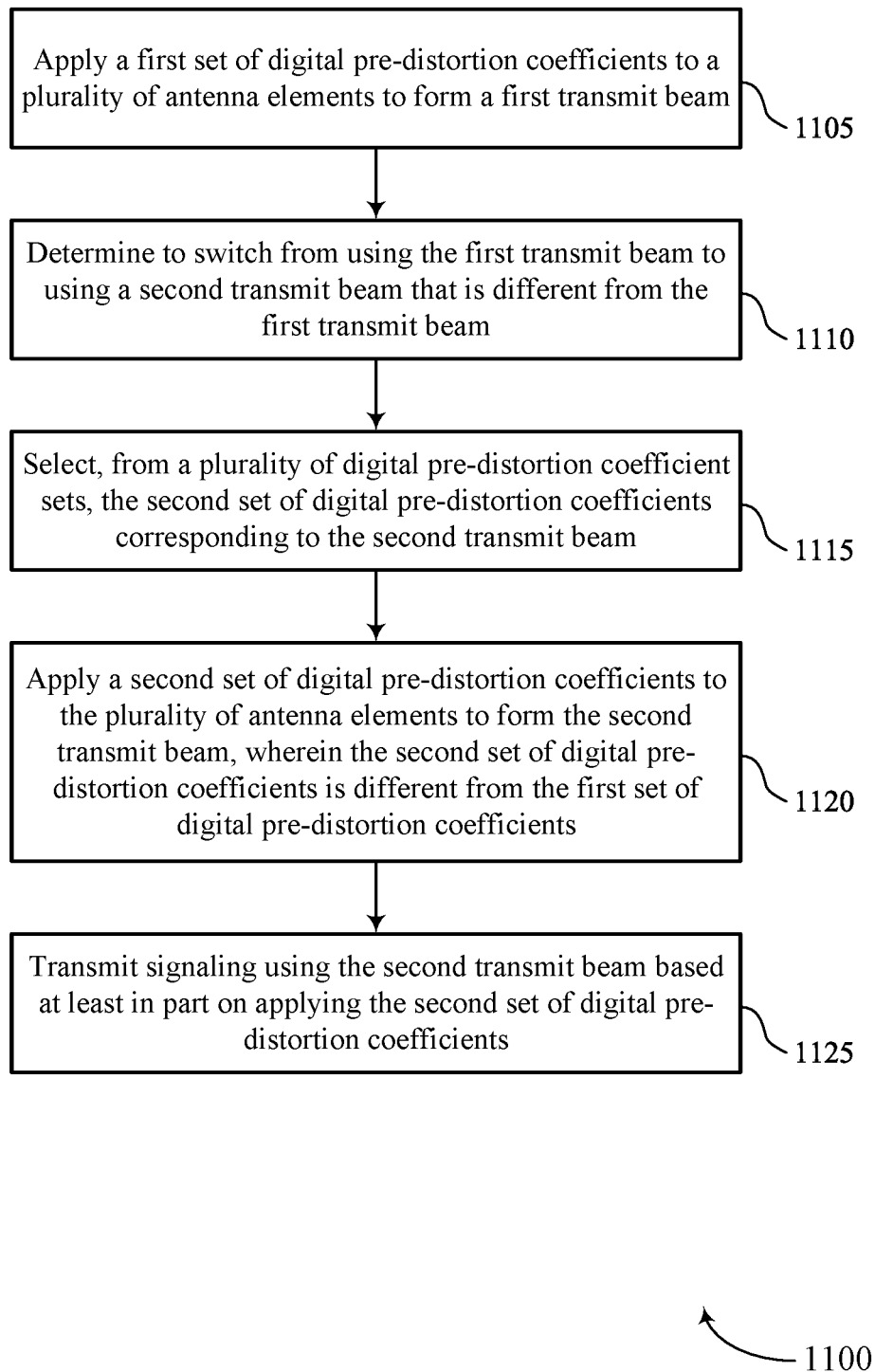

FIG. 11 shows a flowchart illustrating a method 1100 that supports beam dependent DPD in accordance with aspects of the present disclosure. The operations of the method 1100 may be implemented by a transmitting device such as a UE 115 or a base station 105 or its components as described herein. For example, the operations of the method 1100 may be performed by device 505. In some examples, the device 505 may execute a set of instructions to control the functional elements of the device 505 to perform the described functions. Additionally or alternatively, the device 505 may perform aspects of the described functions using special-purpose hardware.

At 1105, the method may include applying a first set of DPD coefficients to a set of multiple antenna elements to form a first transmit beam. The operations of 1105 may be performed in accordance with examples as disclosed herein.

At 1110, the method may include determining to switch from using the first transmit beam to using a second transmit beam that is different from the first transmit beam. The operations of 1110 may be performed in accordance with examples as disclosed herein.

At 1115, the method may include selecting, from a set of multiple DPD coefficient sets, the second set of DPD coefficients corresponding to the second transmit beam. The operations of 1115 may be performed in accordance with examples as disclosed herein.

At 1120, the method may include applying a second set of DPD coefficients to the set of multiple antenna elements to form the second transmit beam, where the second set of DPD coefficients is different from the first set of DPD coefficients. The operations of 1120 may be performed in accordance with examples as disclosed herein.

At 1125, the method may include transmitting signaling using the second transmit beam based on applying the second set of DPD coefficients. The operations of 1125 may be performed in accordance with examples as disclosed herein.

Figure 12:
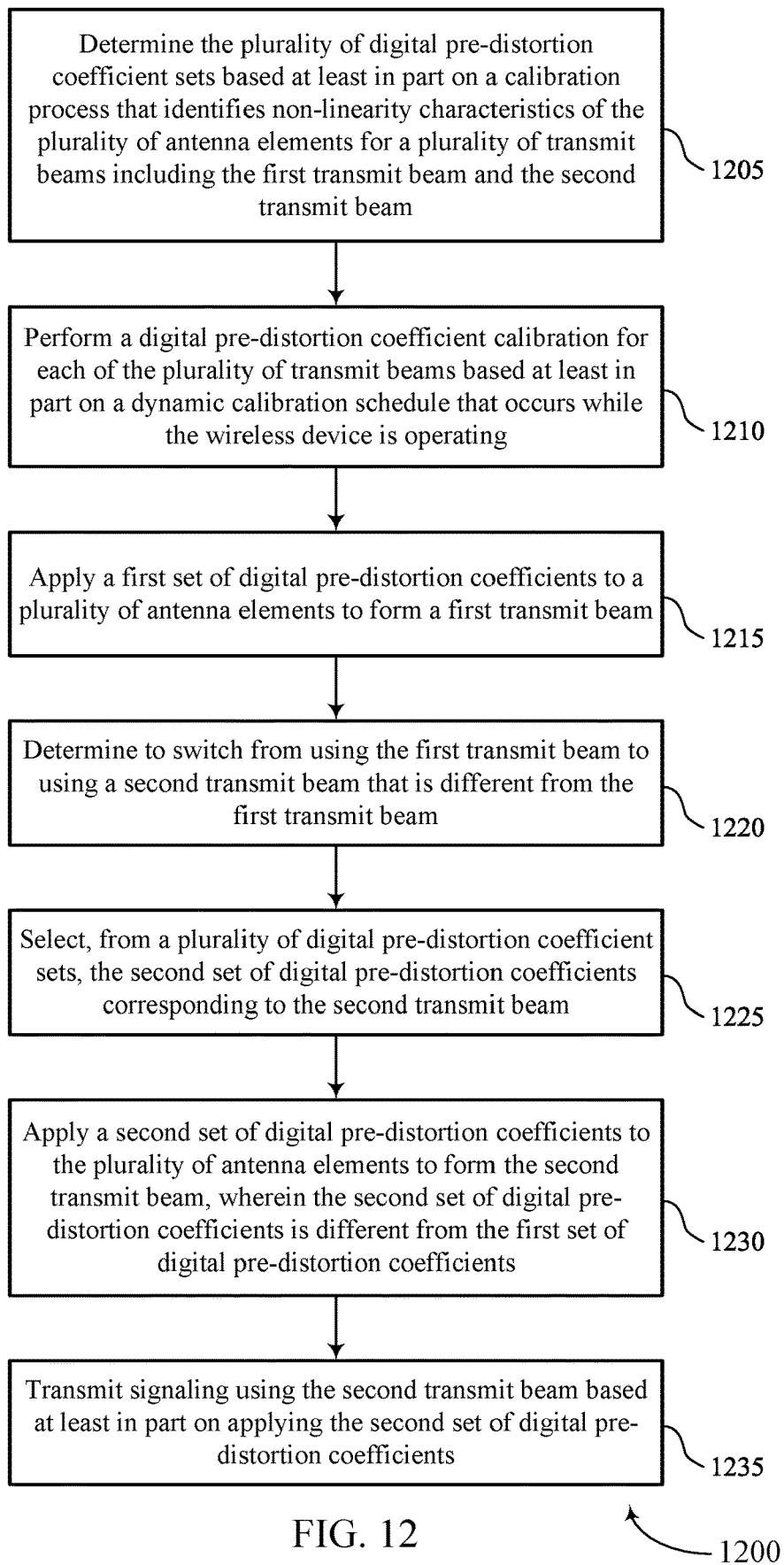

FIG. 12 shows a flowchart illustrating a method 1200 that supports beam dependent DPD in accordance with aspects of the present disclosure. The operations of the method 1200 may be implemented by a transmitting device such as a UE 115 or a base station 105 or its components as described herein. For example, the operations of the method 1200 may be performed by device 505. In some examples, the device 505 may execute a set of instructions to control the functional elements of the device 505 to perform the described functions. Additionally or alternatively, the device 505 may perform aspects of the described functions using special-purpose hardware.

At 1205, the method may include determining the set of multiple DPD coefficient sets based on a calibration process that identifies non-linearity characteristics of the set of multiple antenna elements for a set of multiple transmit beams including the first transmit beam and the second transmit beam. The operations of 1205 may be performed in accordance with examples as disclosed herein.

At 1210, the method may include performing a DPD coefficient calibration for each of the set of multiple transmit beams based on a dynamic calibration schedule that occurs while the wireless device is operating. The operations of 1210 may be performed in accordance with examples as disclosed herein.

At 1215, the method may include applying a first set of DPD coefficients to a set of multiple antenna elements to form a first transmit beam. The operations of 1215 may be performed in accordance with examples as disclosed herein.

At 1220, the method may include determining to switch from using the first transmit beam to using a second transmit beam that is different from the first transmit beam. The operations of 1220 may be performed in accordance with examples as disclosed herein.

At 1225, the method may include selecting, from a set of multiple DPD coefficient sets, the second set of DPD coefficients corresponding to the second transmit beam. The operations of 1225 may be performed in accordance with examples as disclosed herein.

At 1230, the method may include applying a second set of DPD coefficients to the set of multiple antenna elements to form the second transmit beam, where the second set of DPD coefficients is different from the first set of DPD coefficients. The operations of 1230 may be performed in accordance with examples as disclosed herein.

At 1235, the method may include transmitting signaling using the second transmit beam based on applying the second set of DPD coefficients. The operations of 1235 may be performed in accordance with examples as disclosed herein.

Figure 13:
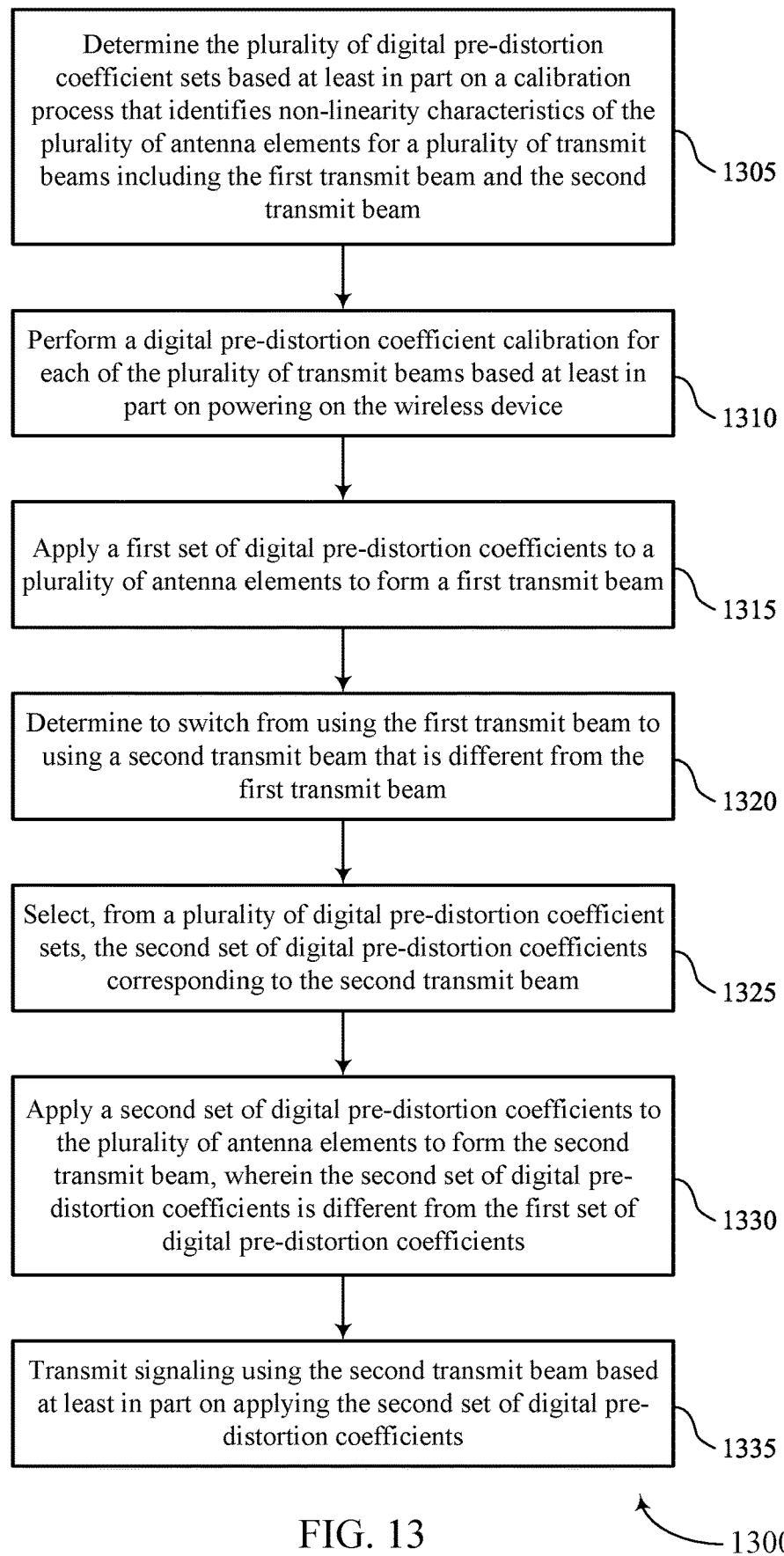

FIG. 13 shows a flowchart illustrating a method 1300 that supports beam dependent DPD in accordance with aspects of the present disclosure. The operations of the method 1300 may be implemented by a transmitting device such as a UE 115 or a base station 105 or its components as described herein. For example, the operations of the method 1300 may be performed by device 505. In some examples, the device 505 may execute a set of instructions to control the functional elements of the device 505 to perform the described functions. Additionally or alternatively, the device 505 may perform aspects of the described functions using special-purpose hardware.

At 1305, the method may include determining the set of multiple DPD coefficient sets based on a calibration process that identifies non-linearity characteristics of the set of multiple antenna elements for a set of multiple transmit beams including the first transmit beam and the second transmit beam. The operations of 1305 may be performed in accordance with examples as disclosed herein.

At 1310, the method may include performing a DPD coefficient calibration for each of the set of multiple transmit beams based on powering on the wireless device. The operations of 1310 may be performed in accordance with examples as disclosed herein.

At 1315, the method may include applying a first set of DPD coefficients to a set of multiple antenna elements to form a first transmit beam. The operations of 1315 may be performed in accordance with examples as disclosed herein.

At 1320, the method may include determining to switch from using the first transmit beam to using a second transmit beam that is different from the first transmit beam. The operations of 1320 may be performed in accordance with examples as disclosed herein.

At 1325, the method may include selecting, from a set of multiple DPD coefficient sets, the second set of DPD coefficients corresponding to the second transmit beam. The operations of 1325 may be performed in accordance with examples as disclosed herein.

At 1330, the method may include applying a second set of DPD coefficients to the set of multiple antenna elements to form the second transmit beam, where the second set of DPD coefficients is different from the first set of DPD coefficients. The operations of 1330 may be performed in accordance with examples as disclosed herein.

At 1335, the method may include transmitting signaling using the second transmit beam based on applying the second set of DPD coefficients. The operations of 1335 may be performed in accordance with examples as disclosed herein.

The following provides an overview of aspects of the present disclosure:

Aspect 1: A method for wireless communication at a wireless device, comprising: applying a first set of digital pre-distortion coefficients to a plurality of antenna elements to form a first transmit beam; determining to switch from using the first transmit beam to using a second transmit beam that is different from the first transmit beam; applying a second set of digital pre-distortion coefficients to the plurality of antenna elements to form the second transmit beam, wherein the second set of digital pre-distortion coefficients is different from the first set of digital pre-distortion coefficients; transmitting signaling using the second transmit beam based at least in part on applying the second set of digital pre-distortion coefficients.

Aspect 2: The method of aspect 1, further comprising: selecting, from a plurality of digital pre-distortion coefficient sets, the second set of digital pre-distortion coefficients corresponding to the second transmit beam.

Aspect 3: The method of aspect 2, further comprising: determining the plurality of digital pre-distortion coefficient sets based at least in part on a calibration process that identifies non-linearity characteristics of the plurality of antenna elements for a plurality of transmit beams including the first transmit beam and the second transmit beam.

Aspect 4: The method of aspect 3, wherein the calibration process comprises: performing a digital pre-distortion coefficient calibration for each of the plurality of transmit beams based at least in part on a dynamic calibration schedule that occurs while the wireless device is operating.

Aspect 5: The method of any of aspects 3 through 4, wherein the calibration process comprises: performing a digital pre-distortion coefficient calibration for each of the plurality of transmit beams based at least in part on powering on the wireless device.

Aspect 6: The method of any of aspects 1 through 5, wherein the plurality of antenna elements are grouped into a plurality of radio frequency modules; and each antenna element of the plurality of antenna elements is associated with a power amplifier.

Aspect 7: The method of aspect 6, wherein the first transmit beam is associated with a first direction and the second transmit beam is associated with a second direction that is different from the first direction.

Aspect 8: The method of any of aspects 6 through 7, wherein the first set of digital pre-distortion coefficients and the second set of digital pre-distortion coefficients are applied by a single digital pre-distortion engine that is common to the plurality of radio frequency modules.

Aspect 9: The method of any of aspects 1 through 8, wherein the wireless device is a base station.

Aspect 10: The method of any of aspects 1 through 9, wherein the wireless device is a user equipment.

Aspect 11: An apparatus for wireless communication at a wireless device, comprising a processor; memory coupled with the processor; and instructions stored in the memory and executable by the processor to cause the apparatus to perform a method of any of aspects 1 through 10.

Aspect 12: An apparatus for wireless communication at a wireless device, comprising at least one means for performing a method of any of aspects 1 through 10.

Aspect 13: A non-transitory computer-readable medium storing code for wireless communication at a wireless device, the code comprising instructions executable by a processor to perform a method of any of aspects 1 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a wireless device, comprising:
   a processor;
   memory coupled with the processor; and
   instructions stored in the memory and executable by the processor to cause the apparatus to:
   apply a first set of digital pre-distortion coefficients to a first plurality of antenna elements to form a first transmit beam that is associated with a first loading configuration of the first plurality of antenna elements;
   determine to switch from using the first transmit beam to using a second transmit beam, the second transmit beam associated with a second loading configuration of a second plurality of antenna elements that is different from the first loading configuration of the first plurality of antenna elements;
   apply a second set of digital pre-distortion coefficients to the first plurality of antenna elements, the second plurality of antenna elements, or both to form the second transmit beam, wherein the second set of digital pre-distortion coefficients is different from the first set of digital pre-distortion coefficients; and
   transmit a signal using the second transmit beam based at least in part on applying the second set of digital pre-distortion coefficients.

2. The apparatus of claim 1, wherein the instructions are further executable by the processor to cause the apparatus to:
   select, from a plurality of digital pre-distortion coefficient sets, the second set of digital pre-distortion coefficients corresponding to the second transmit beam.

3. The apparatus of claim 2, wherein the instructions are further executable by the processor to cause the apparatus to:
   determine the plurality of digital pre-distortion coefficient sets based at least in part on a calibration process that identifies non-linearity characteristics of the first plurality of antenna elements, the second plurality of antenna elements, or both for a plurality of transmit beams including the first transmit beam and the second transmit beam.

4. The apparatus of claim 3, wherein the instructions are further executable by the processor to cause the apparatus to:
perform a digital pre-distortion coefficient calibration for each of the plurality of transmit beams based at least in part on a dynamic calibration schedule that occurs while the wireless device is operating.

5. The apparatus of claim 3, wherein the instructions are further executable by the processor to cause the apparatus to:
perform a digital pre-distortion coefficient calibration for each of the plurality of transmit beams based at least in part on powering on the wireless device.

6. The apparatus of claim 1, wherein:
antenna elements of the first plurality of antenna elements, the second plurality of antenna elements, or both are grouped into a plurality of radio frequency modules; and
each antenna element of the first plurality of antenna elements, the second plurality of antenna elements, or both is associated with a power amplifier.

7. The apparatus of claim 6, wherein the first transmit beam is associated with a first direction and the second transmit beam is associated with a second direction that is different from the first direction.

8. The apparatus of claim 6, wherein the first set of digital pre-distortion coefficients and the second set of digital pre-distortion coefficients are applied by a single digital pre-distortion engine that is common to the plurality of radio frequency modules.

9. The apparatus of claim 1, wherein the wireless device is a network entity.

10. The apparatus of claim 1, wherein the wireless device is a user equipment.

11. A method for wireless communication at a wireless device, comprising:
applying a first set of digital pre-distortion coefficients to a first plurality of antenna elements to form a first transmit beam that is associated with a first loading configuration of the first plurality of antenna elements;
determining to switch from using the first transmit beam to using a second transmit beam, the second transmit beam associated with a second loading configuration of a second plurality of antenna elements that is different from the first loading configuration of the first plurality of antenna elements;
applying a second set of digital pre-distortion coefficients to the first plurality of antenna elements, the second plurality of antenna elements, or both to form the second transmit beam, wherein the second set of digital pre-distortion coefficients is different from the first set of digital pre-distortion coefficients; and
transmitting a signal using the second transmit beam based at least in part on applying the second set of digital pre-distortion coefficients.

12. The method of claim 11, further comprising:
selecting, from a plurality of digital pre-distortion coefficient sets, the second set of digital pre-distortion coefficients corresponding to the second transmit beam.

13. The method of claim 12, further comprising:
determining the plurality of digital pre-distortion coefficient sets based at least in part on a calibration process that identifies non-linearity characteristics of the first plurality of antenna elements, the second plurality of antenna elements, or both for a plurality of transmit beams including the first transmit beam and the second transmit beam.

14. The method of claim 13, wherein the calibration process comprises:
performing a digital pre-distortion coefficient calibration for each of the plurality of transmit beams based at least in part on a dynamic calibration schedule that occurs while the wireless device is operating.

15. The method of claim 13, wherein the calibration process comprises:
performing a digital pre-distortion coefficient calibration for each of the plurality of transmit beams based at least in part on powering on the wireless device.

16. The method of claim 11, wherein:
antenna elements of the first plurality of antenna elements, the second plurality of antenna elements, or both are grouped into a plurality of radio frequency modules; and
each antenna element of the first plurality of antenna elements, the second plurality of antenna elements, or both is associated with a power amplifier.

17. The method of claim 16, wherein the first transmit beam is associated with a first direction and the second transmit beam is associated with a second direction that is different from the first direction.

18. The method of claim 16, wherein the first set of digital pre-distortion coefficients and the second set of digital pre-distortion coefficients are applied by a single digital pre-distortion engine that is common to the plurality of radio frequency modules.

19. The method of claim 11, wherein the wireless device is a network entity.

20. The method of claim 11, wherein the wireless device is a user equipment.

21. An apparatus for wireless communication at a wireless device, comprising:
means for applying a first set of digital pre-distortion coefficients to a first plurality of antenna elements to form a first transmit beam that is associated with a first loading configuration of the first plurality of antenna elements;
means for determining to switch from using the first transmit beam to using a second transmit beam, the second transmit beam associated with a second loading configuration of a second plurality of antenna elements that is different from the first loading configuration of the first plurality of antenna elements;
means for applying a second set of digital pre-distortion coefficients to the first plurality of antenna elements, the second plurality of antenna elements, or both to form the second transmit beam, wherein the second set of digital pre-distortion coefficients is different from the first set of digital pre-distortion coefficients; and
means for transmitting a signal using the second transmit beam based at least in part on applying the second set of digital pre-distortion coefficients.

22. The apparatus of claim 21, further comprising:
means for selecting, from a plurality of digital pre-distortion coefficient sets, the second set of digital pre-distortion coefficients corresponding to the second transmit beam.

23. The apparatus of claim 22, further comprising:
means for determining the plurality of digital pre-distortion coefficient sets based at least in part on a calibration process that identifies non-linearity characteristics of the first plurality of antenna elements, the second plurality of antenna elements, or both for a plurality of transmit beams including the first transmit beam and the second transmit beam.

24. The apparatus of claim 23, wherein the means for the calibration process comprise:
   means for performing a digital pre-distortion coefficient calibration for each of the plurality of transmit beams based at least in part on a dynamic calibration schedule that occurs while the wireless device is operating.

25. The apparatus of claim 23, wherein the means for the calibration process comprise:
   means for performing a digital pre-distortion coefficient calibration for each of the plurality of transmit beams based at least in part on powering on the wireless device.

26. The apparatus of claim 21, wherein:
   antenna elements of the first plurality of antenna elements, the second plurality of antenna elements, or both are grouped into a plurality of radio frequency modules; and
   each antenna element of the first plurality of antenna elements, the second plurality of antenna elements, or both is associated with a power amplifier.

27. The apparatus of claim 26, wherein the first transmit beam is associated with a first direction and the second transmit beam is associated with a second direction that is different from the first direction.

28. The apparatus of claim 26, wherein the first set of digital pre-distortion coefficients and the second set of digital pre-distortion coefficients are applied by a single digital pre-distortion engine that is common to the plurality of radio frequency modules.

29. A non-transitory computer-readable medium storing code for wireless communication at a wireless device, the code comprising instructions executable by a processor to:
   apply a first set of digital pre-distortion coefficients to a first plurality of antenna elements to form a first transmit beam that is associated with a first loading configuration of the first plurality of antenna elements;
   determine to switch from using the first transmit beam to using a second transmit beam, the second transmit beam associated with a second loading configuration of a second plurality of antenna elements that is different from the first loading configuration of the first plurality of antenna elements;
   apply a second set of digital pre-distortion coefficients to the first plurality of antenna elements, the second plurality of antenna elements, or both to form the second transmit beam, wherein the second set of digital pre-distortion coefficients is different from the first set of digital pre-distortion coefficients; and
   transmit a signal using the second transmit beam based at least in part on applying the second set of digital pre-distortion coefficients.

30. The non-transitory computer-readable medium of claim 29, wherein the instructions are further executable by the processor to:
   select, from a plurality of digital pre-distortion coefficient sets, the second set of digital pre-distortion coefficients corresponding to the second transmit beam.

* * * * *